US012523099B2

(12) United States Patent
Chan

(10) Patent No.: US 12,523,099 B2
(45) Date of Patent: Jan. 13, 2026

(54) SAFETY LADDER

(71) Applicants: Ya-Ching Chan, Taichung (TW); Chih-Hsueh Lin, Miami, FL (US)

(72) Inventor: Ya-Ching Chan, Taichung (TW)

(73) Assignees: Ya-Ching Chan, Taichung (TW); Chih-Hsueh, Miami, FL (US)

( * ) Notice: Subject to any disclaimer, the term of this patent is extended or adjusted under 35 U.S.C. 154(b) by 572 days.

(21) Appl. No.: 17/998,314

(22) PCT Filed: May 19, 2021

(86) PCT No.: PCT/IB2021/054303
§ 371 (c)(1),
(2) Date: Nov. 9, 2022

(87) PCT Pub. No.: WO2021/234589
PCT Pub. Date: Nov. 25, 2021

(65) Prior Publication Data

US 2023/0220730 A1 Jul. 13, 2023

(30) Foreign Application Priority Data

May 20, 2020 (TW) ................................ 109116703
Jul. 8, 2020 (TW) ................................ 109123088

(51) Int. Cl.
*E06C 9/08* (2006.01)
*E06C 7/08* (2006.01)
*E06C 7/50* (2006.01)

(52) U.S. Cl.
CPC .............. *E06C 9/085* (2013.01); *E06C 7/082* (2013.01); *E06C 7/505* (2013.01)

(58) Field of Classification Search
CPC .......... E06C 9/085; E06C 7/505; E06C 7/082; E06C 1/387
See application file for complete search history.

(56) References Cited

U.S. PATENT DOCUMENTS 6,012,545 A * 1/2000 Faleide .................. E06C 9/085 182/127
9,587,434 B2 * 3/2017 Frick .................... E04F 11/002
(Continued)

FOREIGN PATENT DOCUMENTS

CN 203271564 U 11/2013
CN 209025595 U 6/2019
(Continued)

OTHER PUBLICATIONS

Translation of JP2002054378 provided by espacenet.*
(Continued)

*Primary Examiner* — Brian D Mattei
(74) *Attorney, Agent, or Firm* — Rosenberg, Klein & Lee

(57) ABSTRACT

A safety ladder for mounting between a support surface and a ground surface includes two support assemblies and parallel step members pivoted between the support assemblies. Each support assembly includes first and second support rods each having upper and lower ends. The upper ends of the first support rods of the support assemblies are configured to be pivoted to the support surface. The safety ladder is movable between a use position, in which the lower ends of the first and second support rods of the support assemblies are adapted to simultaneously contact the ground surface, and a storage position, in which the first and second support rods stand substantially perpendicular relative to the ground surface.

17 Claims, 12 Drawing Sheets

(56) References Cited

U.S. PATENT DOCUMENTS

| | | | | |
|---|---|---|---|---|
| 2014/0345974 | A1* | 11/2014 | Nebel | E06C 5/24 182/159 |
| 2018/0002982 | A1* | 1/2018 | Dressel | E06C 7/16 |
| 2019/0351832 | A1* | 11/2019 | Fuller | E06C 5/36 |
| 2020/0102788 | A1* | 4/2020 | Byers | E06C 7/505 |

FOREIGN PATENT DOCUMENTS

| | | | | |
|---|---|---|---|---|
| CN | 209799776 | U | | 12/2019 |
| CN | 112502607 | A | | 3/2021 |
| JP | 2002054378 | A | * | 2/2002 |

OTHER PUBLICATIONS

Search Report appended to an Office Action, which was issued to Chinese counterpart application No. 202110537925.X by the CNIPA on Oct. 8, 2022, with an English translation thereof.

A Search Report, which was issued to International application No. PCT/IB2021/054303 by the WIPO on Sep. 23, 2021.

* cited by examiner

SAFETY LADDER

FIELD

The disclosure relates to a climbing apparatus, more particularly to a safety ladder.

BACKGROUND

Generally, a building is provided with sunshade panels, skylight panels, etc., and an access door is provided on the sunshade or skylight panel. A ladder is disposed between a ground surface and the access door to facilitate a person to reach the access door, and then open it so as to go out to the top of the sunshade or skylight panel.

An existing ladder is directly fixed to a vertical wall, and includes a pair of long rods, and a plurality of round tubular step members welded between the long rods. The round tubular step members are easy to cause slippage when stepping on the ladder, and the center of gravity falls backward when climbing to a high place, which is not ergonomic, so that use of the existing ladder is dangerous. Further, the access door has to be opened upon reaching the high place, increasing the risk of using the existing ladder.

To solve the above problems, the ladder is placed in an inclined position, however, it will occupy a large space.

SUMMARY

Therefore, an object of the present disclosure is to provide a safety ladder that can enhance safety during use thereof and that can be folded when not in use to save space.

Accordingly, a safety ladder of this disclosure is suitable to be mounted between a support surface and a ground surface. The safety ladder comprises two support assemblies spaced apart from each other in a left-right direction, and a plurality of parallel step members pivotally connected between the support assemblies. Each support assembly includes a first support rod and a second support rod spaced apart from each other in a front-rear direction transverse to the left-right direction. Each of the first and second support rods has an upper end, a lower end opposite to the upper end, and a plurality of spaced-apart pivot connecting portions disposed between the upper end and the lower end.

The upper ends of the first support rods of the support assemblies are configured to be pivotally connected to the support surface so as to be movable up and down relative to the support surface.

The safety ladder is movable between a use position and a storage position. When the safety ladder is moved to the use position, the first and second support rods of the support assemblies stand oblique relative to the support surface and the ground surface, the lower ends of the first and second support rods of the support assemblies are adapted to simultaneously contact the ground surface, and the first and second support rods are parallel to and spaced apart from each other. When the safety ladder is moved to the storage position, the first and second support rods of the support assemblies stand substantially perpendicular relative to the ground surface, and are parallel to and spaced apart from each other.

When the safety ladder is in the use position, the first and second support rods of the support assemblies are configured to form an included angle with the ground surface, and the step members are configured to be disposed substantially parallel to the ground surface even during a change in the included angle.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
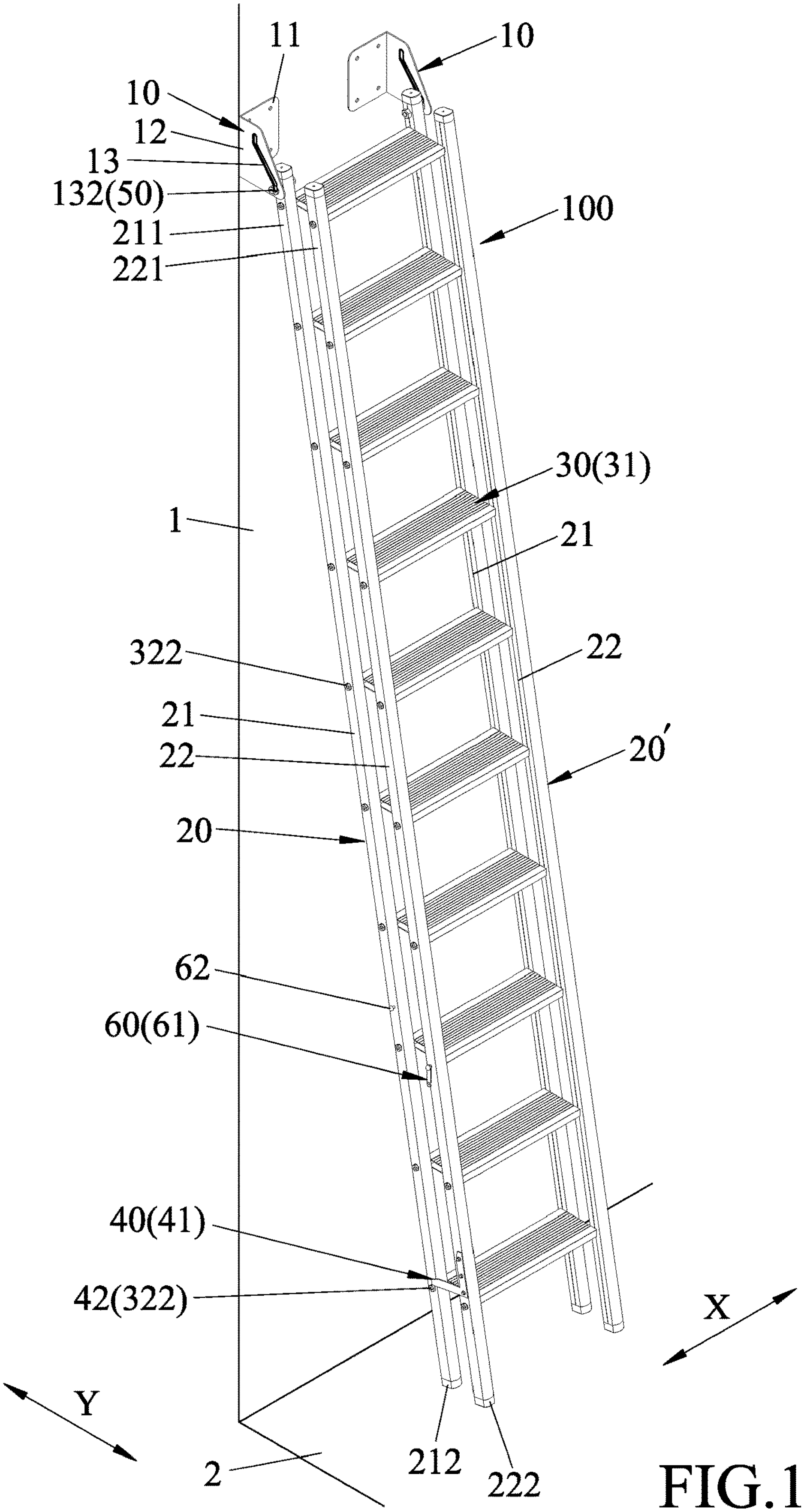
FIG. 1 is a perspective view of a safety ladder according to the first embodiment of the present disclosure in a use position.
Figure 2:
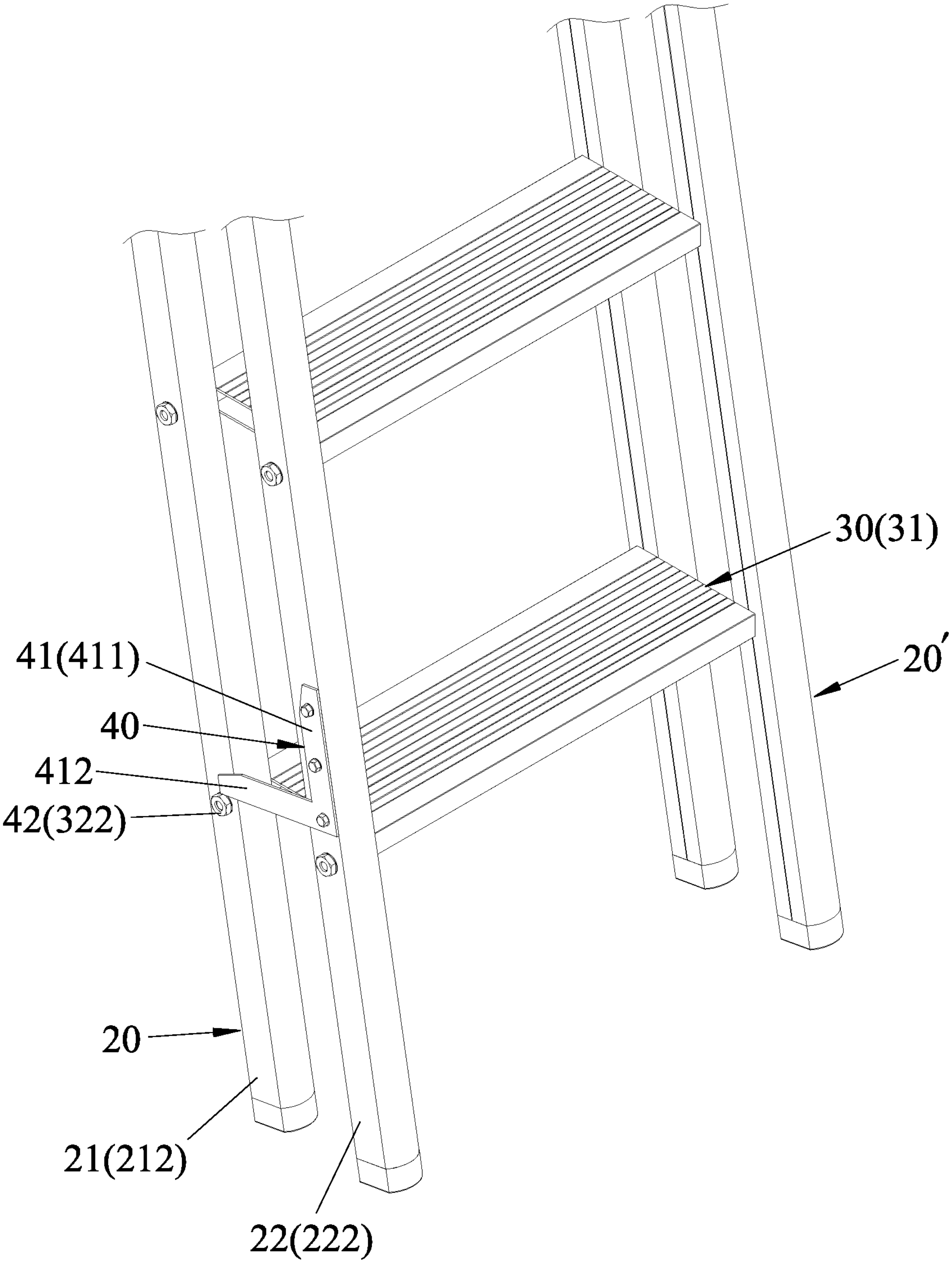
FIG. 2 is an enlarged fragmentary perspective view of the first embodiment.
Figure 3:
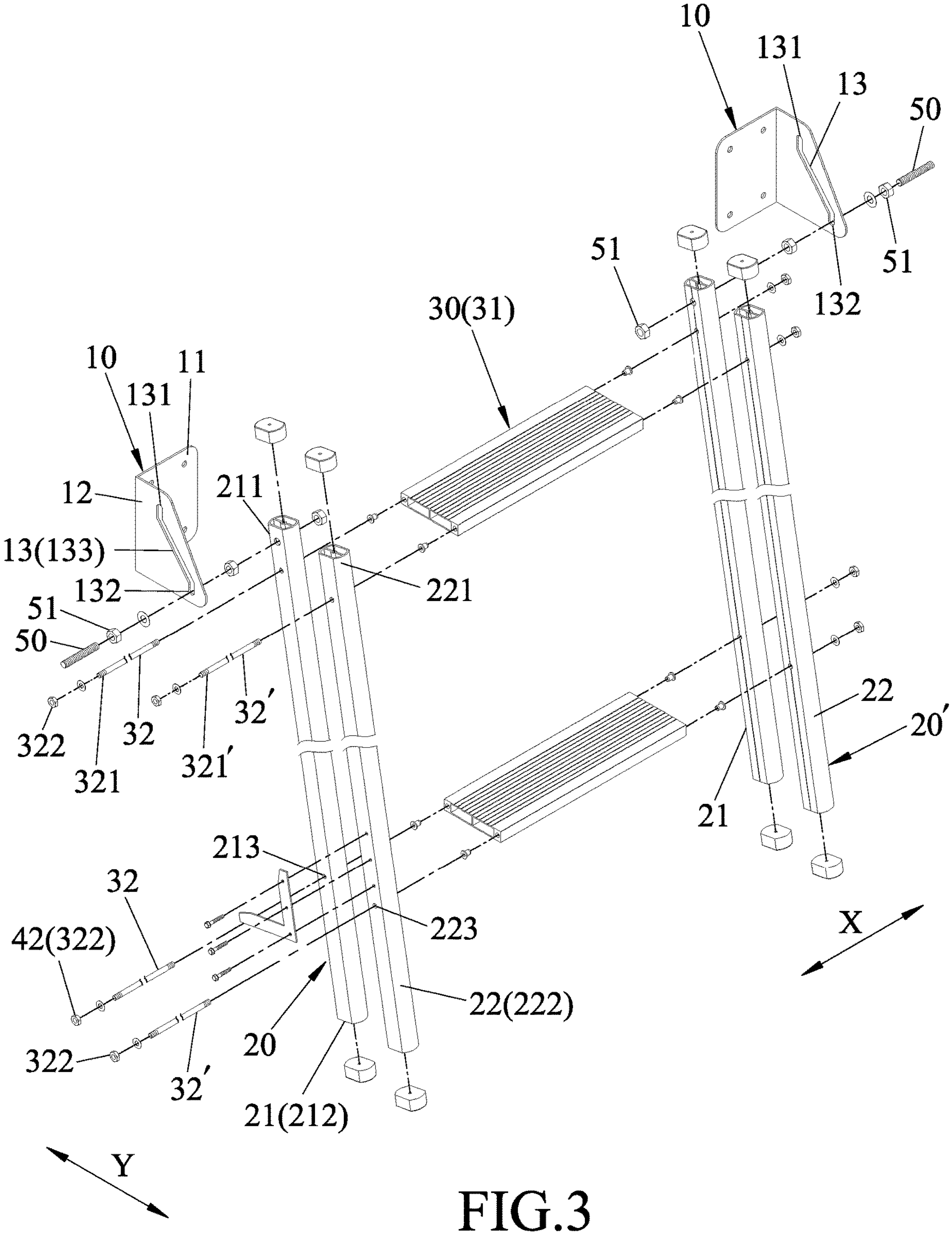
FIG. 3 is a fragmentary exploded perspective view of the first embodiment.

Before the present disclosure is described in greater detail with reference to the accompanying embodiments, it should be noted herein that like elements are denoted by the same reference numerals throughout the disclosure.

Referring to FIGS. 1 to 6, a safety ladder 100 according to the first embodiment of the present disclosure is suitable to be mounted between a support surface 1 and a ground surface 2, and comprises two positioning seats 10, two support assemblies 20, 20', a plurality of parallel step members 30, a safety and limiting unit 40, two guide shafts 50, and a hook assembly 60. The support surface 1 may be, for example, a side wall or ceiling of a building. In this embodiment, the support surface 1 is a side wall of the building.

Each positioning seat 10 has an L-shaped cross section perpendicular to the support surface 1, and includes a fixed plate 11 fixed to the support surface 1, a connecting plate 12 connected transversely to one end of the fixed plate 11, and an elongated guide hole 13 formed in the connecting plate 12. In this embodiment, the guide hole 13 has a hole upper end 131, a hole lower end 132 opposite to the hole upper end 131, and a middle section 133 between the hole upper end 131 and the hole lower end 132. The hole upper end 131 is more proximate to the support surface 1 than the hole lower end 132. The hole upper and lower ends 131, 132 are straight and are parallel to the support surface 1. The middle section 133 extends inclinedly from the hole upper end 131 to the hole lower end 132 away from the support surface 1. In other embodiment, the guide hole 13 may be a straight hole extending from the hole upper end 131 to the hole lower end 132.

The support assemblies 20, 20' are spaced apart from each other in a left-right direction (X). Each support assembly 20, 20' includes a first support rod 21 and a second support rod 22 spaced apart from each other in a front-rear direction (Y) transverse to the left-right direction (X). Each of the first and second support rods 21, 22 is hollow, and has an upper end 211, 221, a lower end 212, 222 opposite to the upper end 211, 221, and a plurality of spaced-apart pivot connecting portions 213, 223 disposed between the upper end 211, 221 and the lower end 212, 222. In this embodiment, each pivot connecting portion 213, 223 is configured as a pair of aligned through holes.

The step members 30 are pivotally connected between the support assemblies 20, 20'. In this embodiment, each step member 30 has a rectangular shape, and includes a step main body 31, rear and front pivot shafts 32, 32' respectively inserted into two long sides of the step main body 31, and a plurality of fastening nuts 322. The rear pivot shaft 32 has two rear connecting ends 321 extending out of two short sides of the step main body 31 and respectively inserted into one of the pivot connecting portions 213 of the first support rod 21 of the support assembly 20 and a corresponding one of the pivot connecting portions 213 of the first support rod 21 of the support assembly 20'. The front pivot shaft 32' has two front connecting ends 321' extending out of the two short sides of the step main body 31 and respectively inserted into one of the pivot connecting portions 223 of the second support rod 22 of the support assembly 20 and a corresponding one of the pivot connecting portions 223 of the second support rod 22 of the support assembly 20'. The fastening nuts 322 are engaged to the rear connecting ends 321 of the rear pivot shaft 32 and the front connecting ends 321' of the front pivot shaft 32'. Through this, each step member 30 is pivotally connected to the first and second support rods 21, 22 of the support assemblies 20, 20'.

The safety and limiting unit 40 includes a limiting rod 41 and a stop member 42. In this embodiment, the limiting rod 41 is L-shape, and is proximate to the lower end 222 of the second support rod 22 of the support assembly 20. The limiting rod 41 has a fixed section 411 fixed to the second support rod 22 of the support assembly 20, and an abutment section 412 extending transversely from one end of the fixed section 411 toward the first support rod 21 of the support assembly 20. The stop member 42 is fixed to the first support rod 21 of the support assembly 20. In this embodiment, the stop member 42 is actually one of the fastening nuts 322 located most proximate to the lower end 212 of the first support rod 21 of the support assembly 20.

The guide shafts 50 are respectively connected to the upper ends 211 of the first guide rods 21 of the support assemblies 20, 20'. Specifically, the guide shafts 50 extend through the guide holes 13 in the connecting plates 12 of the respective positioning seats 10 into uppermost ones of the pivot connecting portions 213 of the first support rods 21 of the respective support assemblies 20, 20', and are secured thereto using a plurality of fastening nuts 51. Through this, the upper ends 211 of the first rods 21 of the support assemblies 20, 20' are connected pivotally and respectively to the positioning seats 10 through the the guide shafts 50, and are movable up and down along the guide holes 13 through the guide shafts 50.

In this embodiment, the hook assembly 60 includes an engaging hook 61 pivotally connected to the second support rod 22 of the support assembly 20 and having an engaging groove 611 (see FIGS. 4 and 5), and an engaging pin 62 fixed to the first support rod 21 of the support assembly 20 for engagement with the engaging groove 611.

Figure 4:
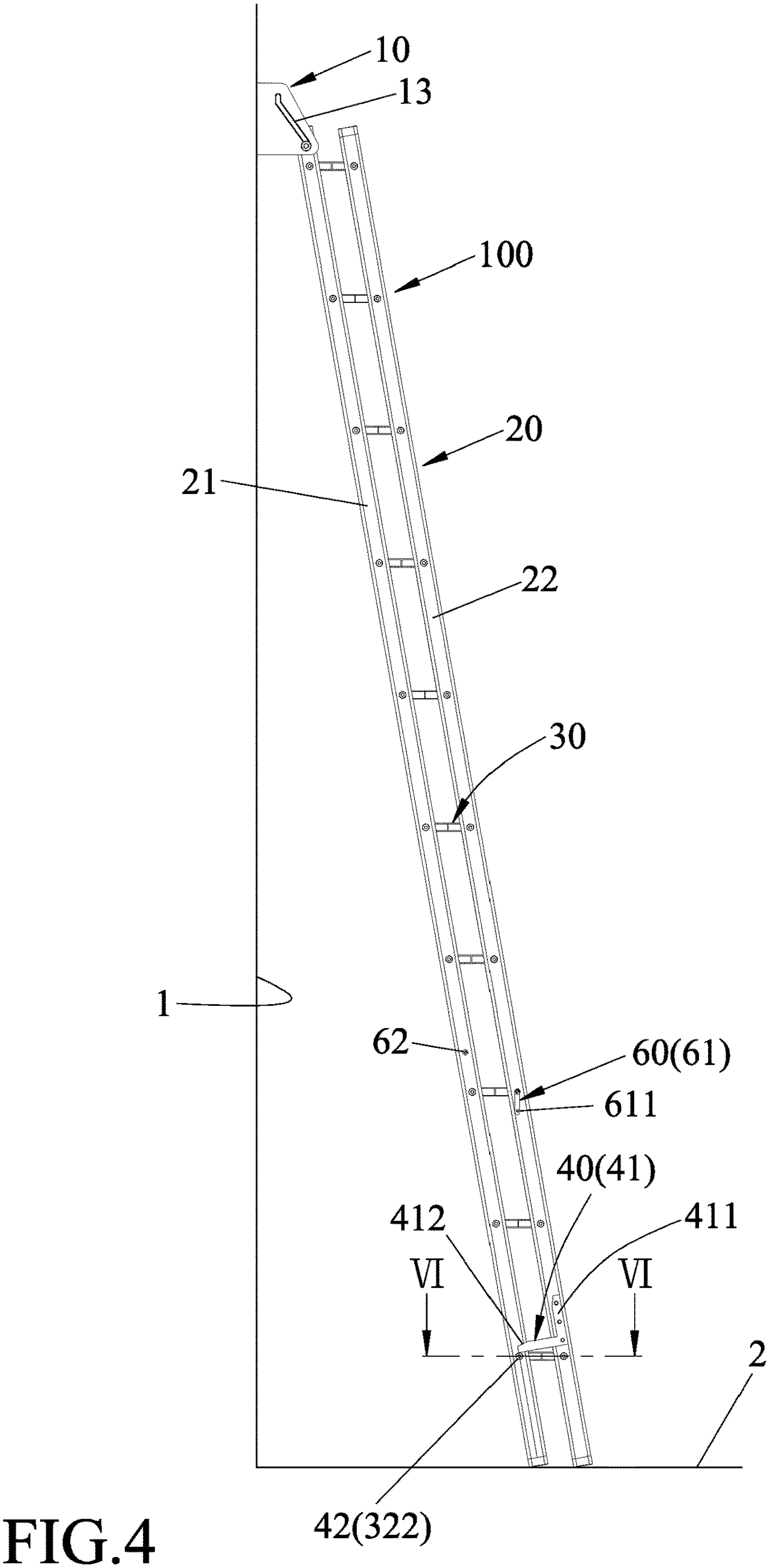
FIG. 4 is a schematic side view of the first embodiment.
Figure 5:
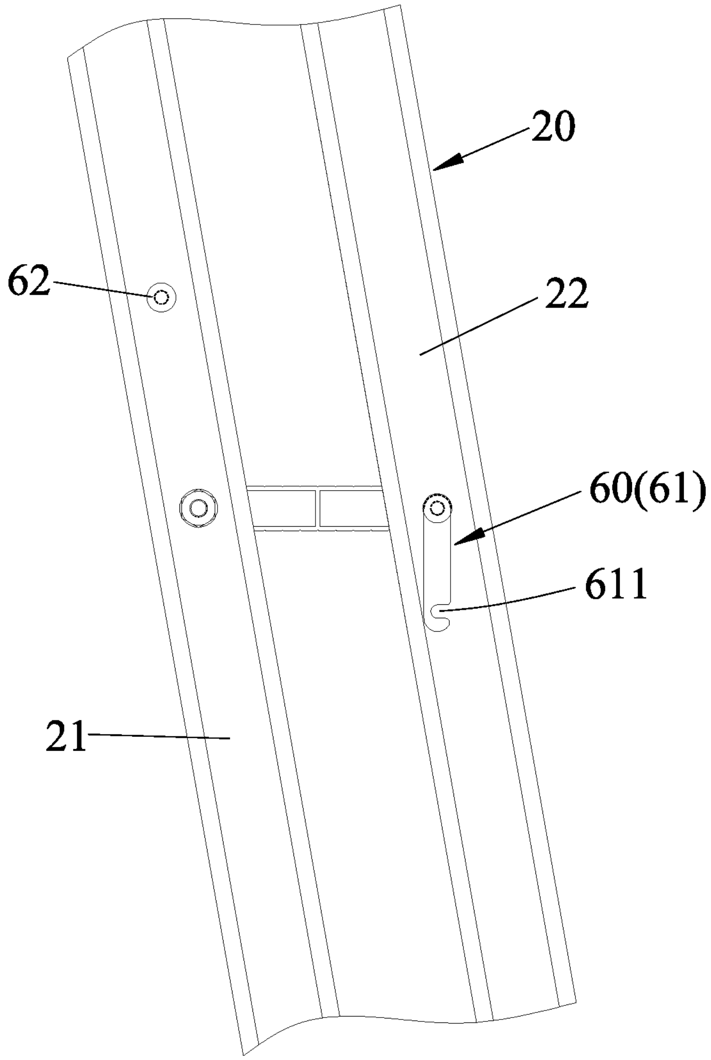
FIG. 5 is an enlarged fragmentary perspective view of FIG. 4.
Figure 6:
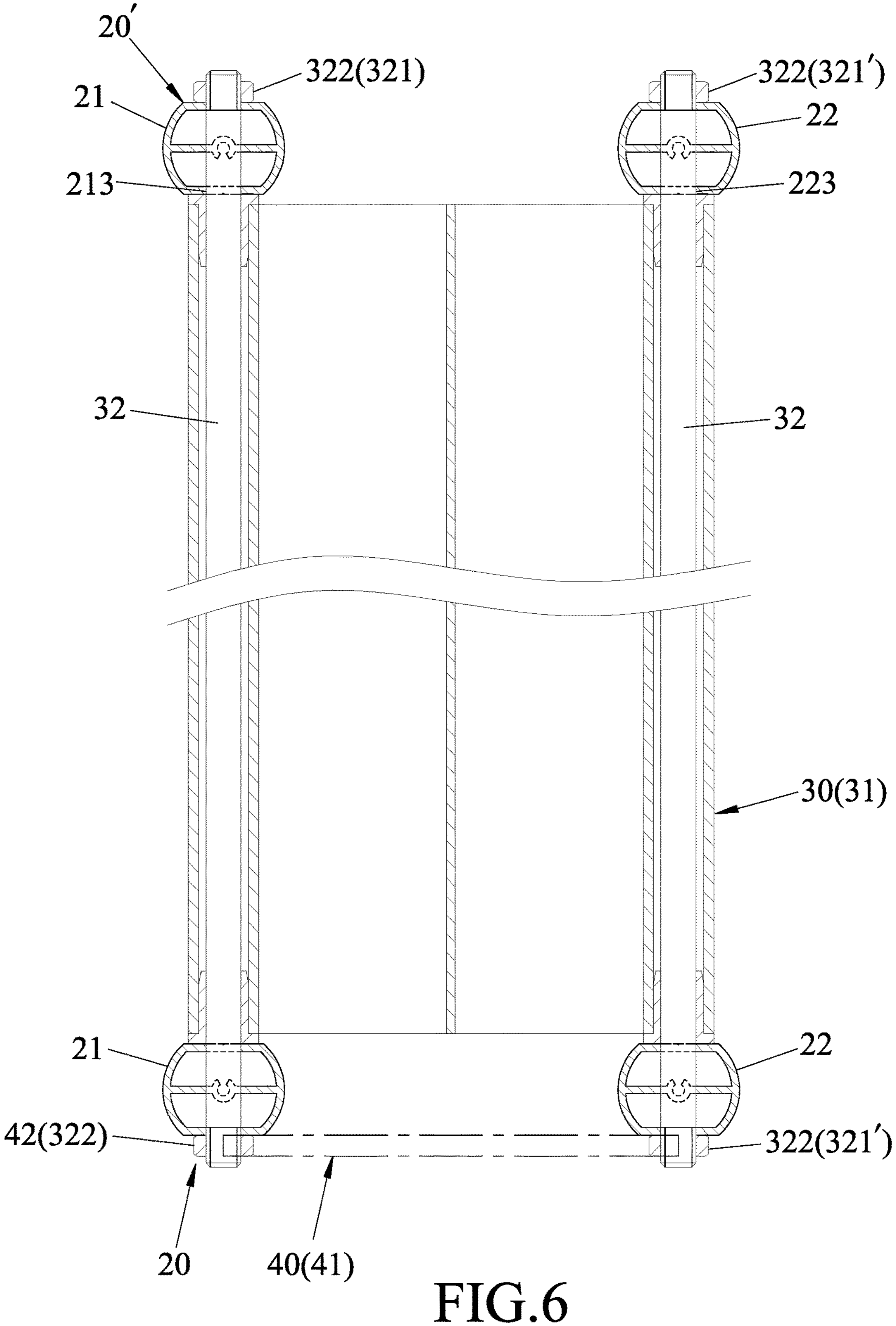
FIG. 6 is a sectional view taken along line VI-VI of FIG. 4.

The safety ladder 100 is movable between a use position and a storage position. With reference to FIGS. 1 and 4, when the safety ladder 100 is placed in the use position, the first and second support rods 21, 22 of the support assemblies 20, 20' stand oblique relative to the support surface 1 and the ground surface 2. Specifically, the upper ends 211 of the first support rods 21 of the support assemblies 20, 20' are positioned on the lower ends 132 of the guide holes 13 of the connecting plates 12 through the guide shafts 50, the lower ends 212, 222 of the first and second support rods 21, 22 of the support assemblies 20, 20' simultaneously contact the ground surface 2, and the first and second support rods 21, 22 of the support assemblies 20, 20' are parallel to and spaced apart from each other. Further, the first and second support rods 21, 22 of the support assemblies 20, 20' form an included angle, which is an acute angle, with the ground surface 2, and the step main bodies 31 of the step members 30 are substantially parallel to the ground surface 2. At this time, a user can stably step on the step members 30 and climb the safety ladder 100 steadily and safely. It should be noted herein that the step main bodies 31 of the step members 30 are parallel to the ground surface 2 even during a change in the included angle.

Moreover, when the first support rods 21 are spaced apart from the second support rods 22, the stop member 42 contacts and stops a free end of the abutment section 412 of the limiting rod 41, which is distal to the fixed section 411, from moving downward so as to maintain a fixed distance between the first support rods 21 and the second support rods 22, so that the stability of the support assemblies 20, 20' and the safety of stepping on the step members 30 can be further ensured. The engaging hook 61 is separated from the engaging pin 62 at this state.

In the above use position, when the first support rods 21 and the second support rods 22 form the acute angle with the ground surface 2, by pre-measurement and accurate control of the mounting position of the limiting rod 41 relative to the stop member 42, the first support rods 21 and the second support rods 22 can be controlled to maintain a fixed angle with the ground surface 2 each time they are used. That is, every time the support assemblies 20, 20' are used, the stop member 42 can contact and stop the free end of the abutment section 412 of the limiting rod 41 so as to fix the distance between the first support rods 21 and the second support rods 22, thereby ensuring the stability of the support assemblies 20, 20' and the safety of stepping on the step members 30.

When use of the safety ladder 100 is not required, the safety ladder 100 can be moved to the storage position. In this embodiment, the storage position includes a first storage position (see FIG. 7) and a second storage position (see FIGS. 8 and 9).

Figure 7:
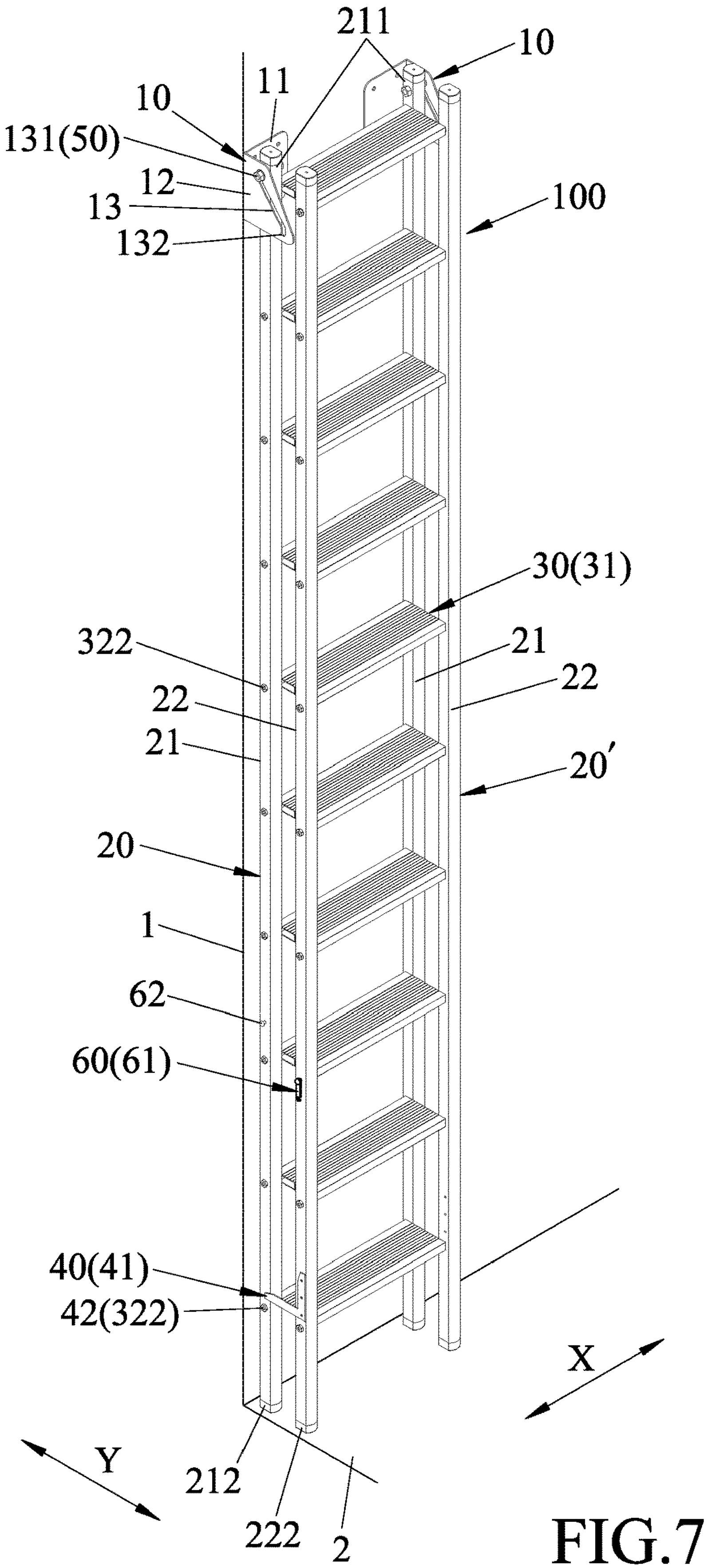
FIG. 7 is a perspective view of the first embodiment in a first storage position.

In the first storage position, as shown in FIG. 7, the upper ends 211 of the first support rods 21 are moved upward from the hole lower ends 132 to the hole upper ends 131 of the guide holes 13 through the guide shafts 50 so as to move the first support rods 21 close to the support surface 1. At this position, the first support rods 21 and the second support rods 22 are parallel to and spaced apart from each other, and the safety ladder 100 can serve as a display rack, in which display items (not shown), such as plants, books, etc., can be placed on the step members 30.

Figure 8:
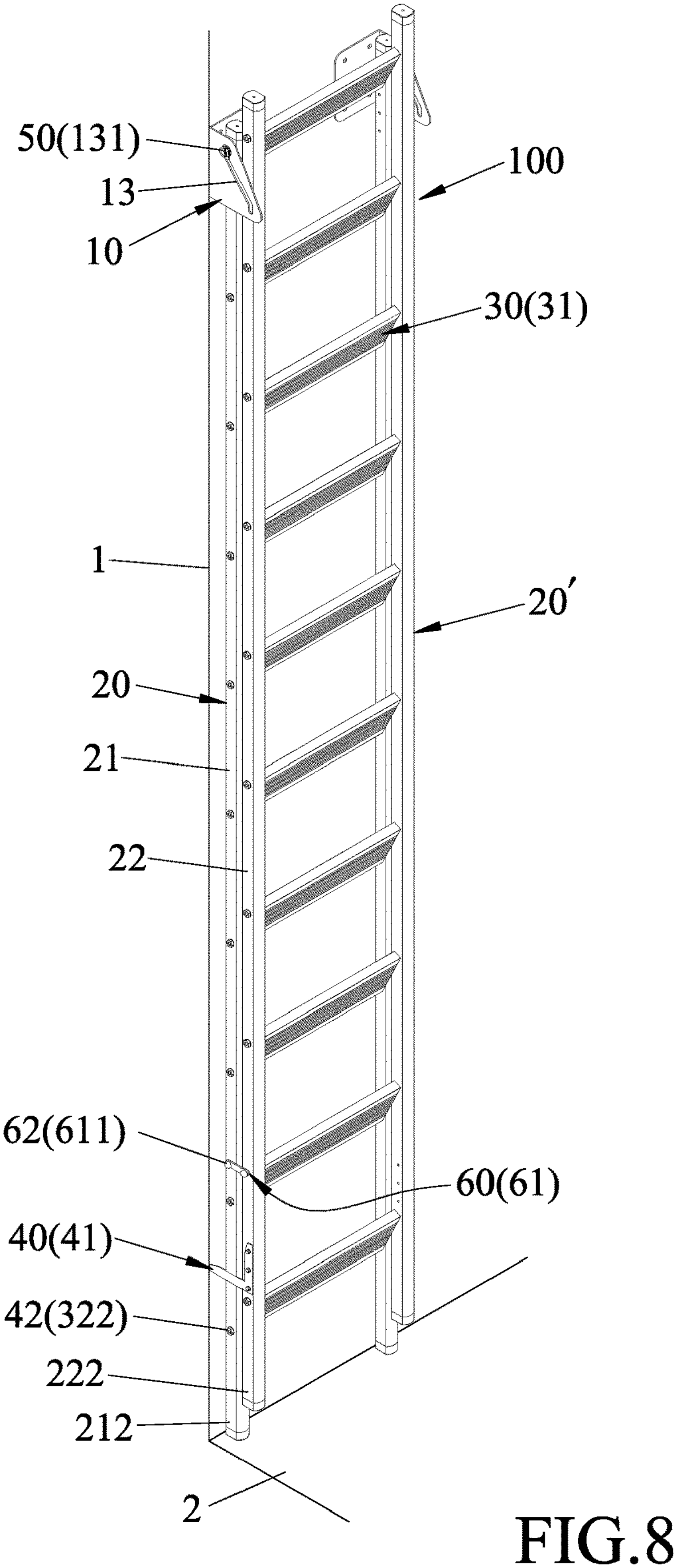
FIG. 8 is a perspective view of the first embodiment in a second storage position.
Figure 9:
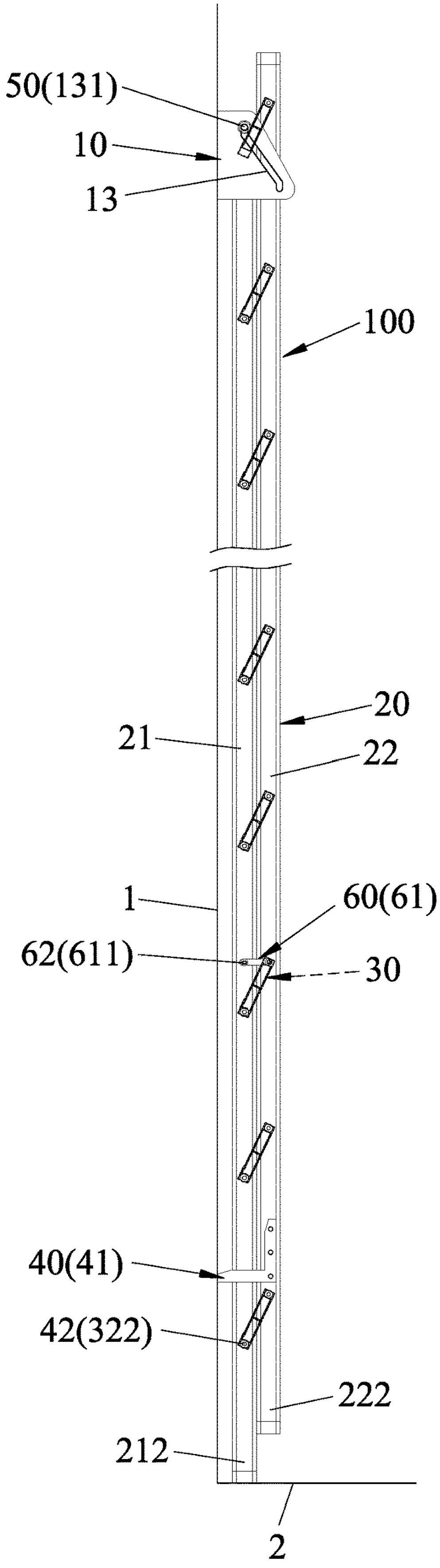
FIG. 9 is a schematic side view of FIG. 8.

In the second storage position, as shown in FIGS. 8 and 9, the second support rods 22 are first moved pivotally upward toward the first support rods 21, and the step members 30 are driven to pivot therealong, so that the distance between the first support rods 21 and the second support rods 22 becomes small. Next, the entire support assemblies 20, 20' are moved upward with the upper ends 211 of the first support rods 21 being moved from the hole lower ends 132 to the hole upper ends 131 of the guide holes 13 through the guide shafts 50 and with the lower ends 212, 222 of the first support rods 21 and the second support rods 22 being moved toward the support surface 1. At this time, the step main bodies 31 of the step members 30 are inclined relative to the ground surface 2, and the abutment section 412 of the limiting rod 41 is moved away from the stop member 42. Then, the engaging groove 611 of the engaging hook 61 is engaged to the engaging pin 62, so that the first support rods 21 and the second support rods 22 are relatively positioned with respect to each other. The overall volume of the safety ladder 100 is thus reduced.

It should be noted herein that the first and second support rods 21, 22 of the support assemblies 20, 20' are substantially perpendicular relative to the ground surface 2 whether the safety ladder 100 is in the first or second storage position.

Therefore, through the provision of the safety and limiting unit 40, when the first support rods 21 are spaced apart from the second support rods 22, the stop member 42 can contact and stop the free end of the abutment section 412 of the limiting rod 41 to maintain the distance between the first support rods 21 and the second support rods 22 fixed, thereby ensuring the stability of the support assemblies 20, 20' and the safety of stepping on the step members 30. When the second support rods 22 are brought close to the first support rods 21 and the lower ends 212, 222 of the first and second support rods 21, 22 of the support assemblies 20, 20' are moved toward the support surface 1, the overall volume of the safety ladder 100 can be reduced, so that the safety ladder 100 does not occupy a large space, and is practical and safe to use.

It is worth to mention herein that, during shifting of the safety ladder 100 from the use position shown in FIG. 4 to the second storage position shown in FIGS. 8 and 9, the second support rods 22 are first lifted upward and then moved toward the first support rods 21 with the lower ends 222 of the second support rods 22 being moved away from the ground surface 2, after which the engaging groove 611 of the engaging hook 61 is engaged to the engaging pin 62, so that only the lower ends 212 of the first support rods 21 have friction with the ground surface 2. Thus, storage of the safety ladder 100 can be performed with less effort.

The beneficial effect of this disclosure resides in that, when the safety ladder 100 is in the use state, the bottom ends of the first and second support rods 21, 22 contact the ground surface at the same time, and first and second support rods 21, 22 stand oblique relative to the support surface 1 and the ground surface 2. Further, the step members 30 are configured to be disposed substantially parallel to the ground surface 2 even if there is a change in the included angle. Thus, the stability of the safety ladder 100 can be increased. When the safety ladder 100 is in the storage state, the first and second support rods 21, 22 stand substantially perpendicular relative to the ground surface 2, so that the storage volume of the safety ladder 100 can be reduced.

Figure 10:
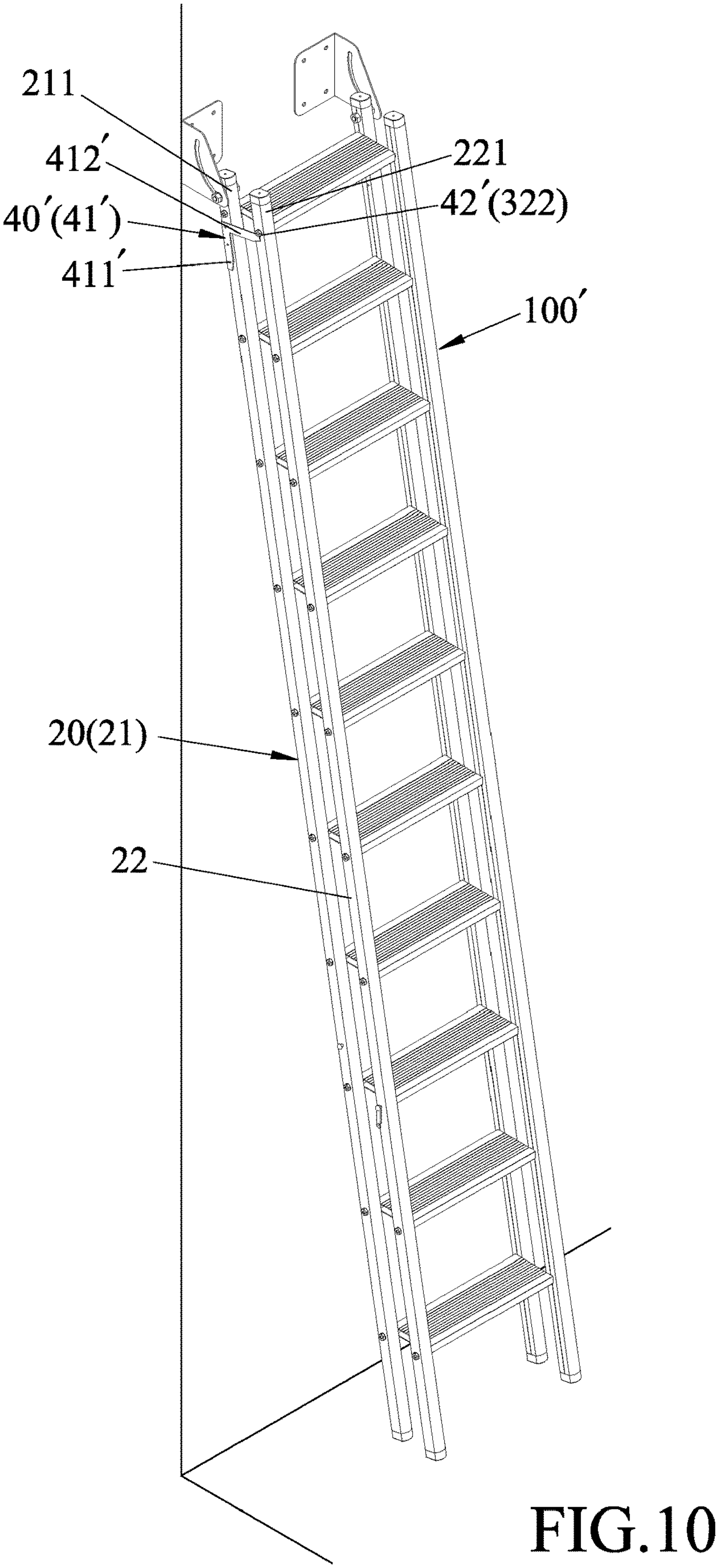
FIG. 10 is a perspective view of a safety ladder according to the second embodiment of the present disclosure in a use position.
Figure 11:
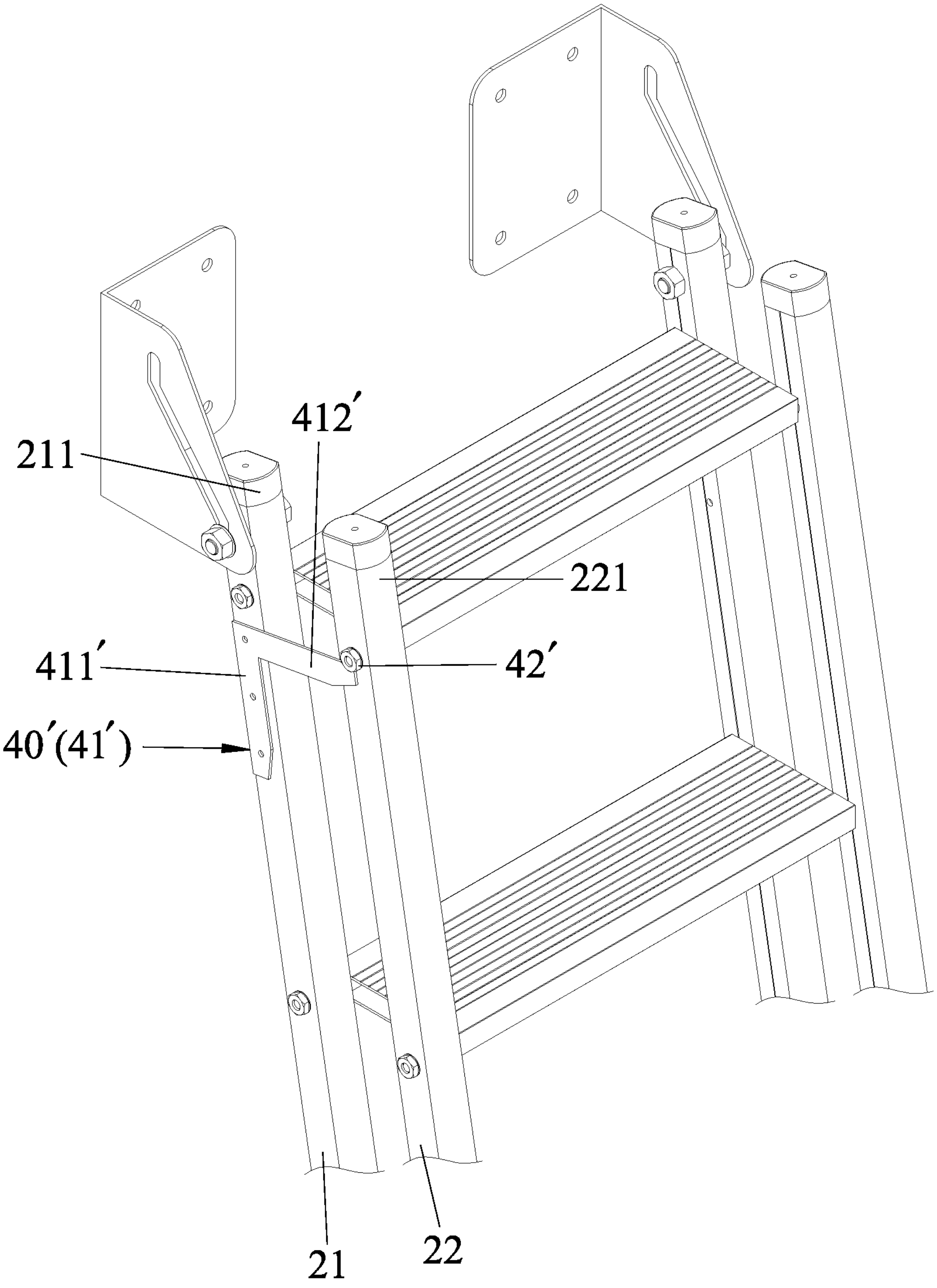
FIG. 11 is an enlarged fragmentary perspective view of the second embodiment.
Figure 12:
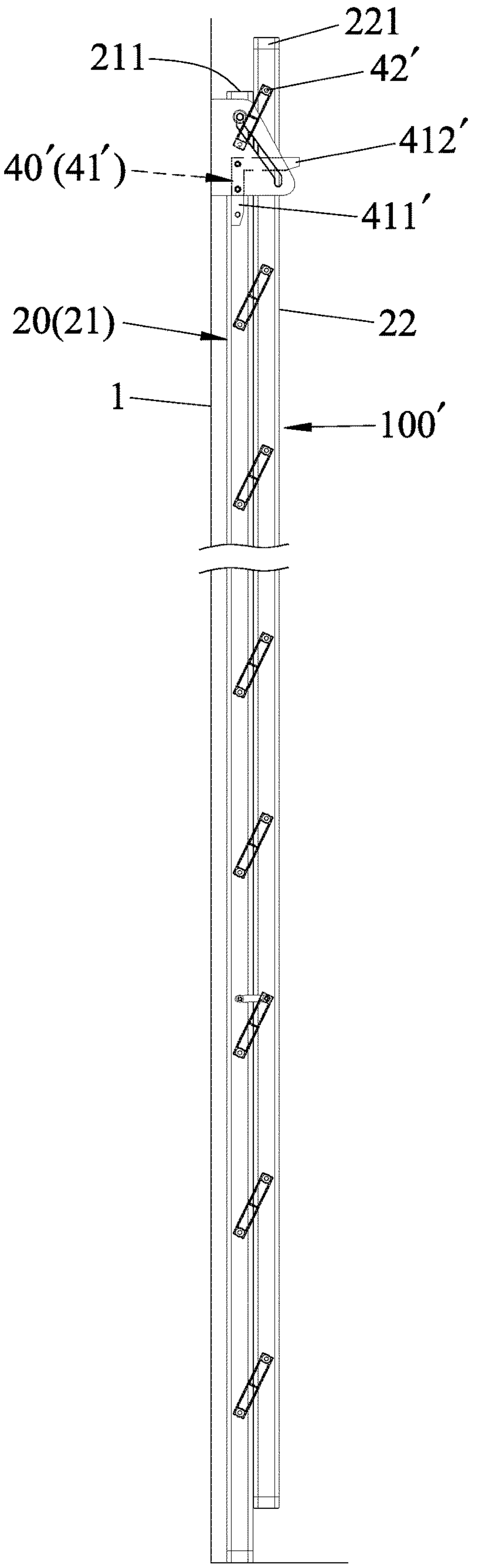
FIG. 12 is a schematic side view of the second embodiment in a second storage position.

Referring to FIGS. 10 to 12, the second embodiment of the safety ladder 100' of this disclosure differs from the first embodiment in that the limiting rod 41' of the safety and limiting unit 40' of the second embodiment is inverted L-shape. The fixed section 411' of the limiting rod 41' is fixed to the first support rod 21 of the support assembly 20, and the abutment section 412' thereof extends transversely from one end of the fixed section 411' toward the second support rod 22 of the support assembly 20. The limiting rod 41' is proximate to the upper end 211 of the first support rod 21 of the support assembly 20. The stop member 42' is proximate to the upper end 221 of the second support rod 22 of the support assembly 20. The advantages of the first embodiment can be similarly achieved using the second embodiment.

In summary, the structure of the safety ladder 100, 100' is simple, and the manufacturing and assembly thereof are easy.

Therefore, the object of this disclosure can indeed be achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A safety ladder suitable to be mounted between a support surface and a ground surface, comprising:

two support assemblies spaced apart from each other in a left-right direction, each of said support assemblies including a first support rod and a second support rod spaced apart from each other in a front-rear direction transverse to the left-right direction, each of said first and second support rods having an upper end, a lower end opposite to said upper end, and a plurality of spaced-apart pivot connecting portions disposed between said upper end and said lower end; and a plurality of parallel step members pivotally connected between said support assemblies;

wherein said upper ends of said first support rods of said support assemblies are configured to be pivotally connected to the support surface so as to be movable up and down relative to the support surface;

wherein said safety ladder is movable between a use position and a storage position;

wherein, when said safety ladder is moved to said use position, said first and second support rods of said support assemblies stand oblique relative to the support surface and the ground surface, said lower ends of said first and second support rods of said support assemblies are adapted to simultaneously contact the ground surface, and said first and second support rods are parallel to and spaced apart from each other;

wherein, when said safety ladder is moved to said storage position, said first and second support rods of said support assemblies stand substantially perpendicular relative to the ground surface, and are parallel to and spaced apart from each other;

wherein, when said safety ladder is in said use position, said first and second support rods of said support assemblies are configured to form an included angle with the ground surface, and said step members are configured to be disposed substantially parallel to the ground surface even during a change in said included angle;

wherein said safety ladder further comprises two positioning seats configured to be fixed to the support surface and respectively having an elongated guide hole, and two guide shafts respectively extending through said elongated guide holes in said positioning seats and respectively connected to said upper ends of said first support rods of said support assemblies so as to respectively connect said upper ends of said first support rods of said support assemblies to said positioning seats; and wherein said elongated guide hole in each of said positioning seats has a hole upper end, a hole lower end opposite to said hole upper end, and a middle section between said hole upper end and said hole lower end, said hole upper end being configured to be more proximate to the support surface than said hole lower end, said middle section extending inclinedly from said hole upper end to said hole lower end away from the support surface, said guide shafts respectively extending through said elongated guide holes in said positioning seats to connect pivotally and respectively said upper ends of said first support rods of said support assemblies to said positioning seats.

2. The safety ladder as claimed in claim 1, wherein each of said step members has two rear connecting ends connected pivotally and respectively to one of said pivot connecting portions of said first support rod of one of said support assemblies and a corresponding one of said pivot connecting portions of said first support rod of the other one of said support assemblies, and two front connecting ends connected pivotally and respectively to one of said pivot connecting portions of said second support rod of said one of said support assemblies and a corresponding one of said pivot connecting portions of said second support rod of said other one of said support assemblies.

3. The safety ladder as claimed in claim 2, wherein each of said step members includes a step main body, and rear and front pivot shafts extending into said step main body, said rear pivot shaft having said rear connecting ends, said front pivot shaft having said front connecting ends, each of said step members further including a plurality of fastening nuts engaged to said rear connecting ends of said rear pivot shaft and said front connecting ends of said front pivot shaft so as to pivotally connect each of said step members to said first and second support rods of said support assemblies.

4. The safety ladder as claimed in claim 1, further comprising a safety and limiting unit which includes a limiting rod fixed to one of said first and second support rods of said one of said support assemblies, and a stop member fixed to the other one of said first and second support rods of said one of said support assemblies, said stop member contacting and stopping said limiting rod when said first support rods of said support assemblies are spaced apart from said second support rods of said support assemblies to maintain a fixed distance between said first and second support rods of said support assemblies, said stop member being distal to said limiting rod when said first and second support rods of said support assemblies are proximate to each other.

5. The safety ladder as claimed in claim 4, wherein said limiting rod is L-shape, and has a fixed section fixed to said second support rod of said one of said support assemblies, and an abutment section extending transversely from one end of said fixed section toward said first support rod of said one of said support assemblies, said limiting rod being proximate to said lower end of said second support rod of said one of said support assemblies, said stop member being proximate to said lower end of said first support rod of said one of said support assemblies.

6. The safety ladder as claimed in claim 4, wherein said limiting rod is inverted L-shape, and has a fixed section fixed to said first support rod of said one of said support assemblies, and an abutment section extending transversely from one end of said fixed section toward said second support rod of said one of said support assemblies, said limiting rod being proximate to said upper end of said first support rod of said one of said support assemblies, said stop member being proximate to said upper end of said second support rod of said one of said support assemblies.

7. The safety ladder as claimed in claim 1, further comprising a hook assembly that includes an engaging hook pivotally connected to said second support rod of one of said support assemblies and having an engaging groove, and an engaging pin fixed to said first support rod of said one of said support assemblies for engagement with said engaging groove to place said safety ladder in said storage position.

8. A safety ladder suitable to be mounted between a support surface and a ground surface, comprising:

two support assemblies spaced apart from each other in a left-right direction, each of said support assemblies including a first support rod and a second support rod spaced apart from each other in a front-rear direction transverse to the left-right direction, each of said first and second support rods having an upper end, a lower end opposite to said upper end, and a plurality of spaced-apart pivot connecting portions disposed between said upper end and said lower end; and a plurality of parallel step members pivotally connected between said support assemblies;

wherein said upper ends of said first support rods of said support assemblies are configured to be pivotally connected to the support surface so as to be movable up and down relative to the support surface;

wherein said safety ladder is movable between a use position and a storage position;

wherein, when said safety ladder is moved to said use position, said first and second support rods of said support assemblies stand oblique relative to the support surface and the ground surface, said lower ends of said first and second support rods of said support assemblies are adapted to simultaneously contact the ground surface, and said first and second support rods are parallel to and spaced apart from each other;

wherein, when said safety ladder is moved to said storage position, said first and second support rods of said support assemblies stand substantially perpendicular relative to the ground surface, and are parallel to and spaced apart from each other;

wherein, when said safety ladder is in said use position, said first and second support rods of said support assemblies are configured to form an included angle with the ground surface, and said step members are configured to be disposed substantially parallel to the ground surface even during a change in said included angle;

wherein said safety ladder further comprises a safety and limiting unit which includes a limiting rod fixed to one of said first and second support rods of said one of said support assemblies, and a stop member fixed to the other one of said first and second support rods of said one of said support assemblies, said stop member contacting and stopping said limiting rod when said first support rods of said support assemblies are spaced apart from said second support rods of said support assemblies to maintain a fixed distance between said first and second support rods of said support assemblies, said stop member being distal to said limiting rod when said first and second support rods of said support assemblies are proximate to each other; and wherein said limiting rod is L-shape, and has a fixed section fixed to said second support rod of said one of said support assemblies, and an abutment section extending transversely from one end of said fixed section toward said first support rod of said one of said support assemblies, said limiting rod being proximate to said lower end of said second support rod of said one of said support assemblies, said stop member being proximate to said lower end of said first support rod of said one of said support assemblies.

9. The safety ladder as claimed in claim 8, wherein each of said step members has two rear connecting ends connected pivotally and respectively to one of said pivot connecting portions of said first support rod of one of said support assemblies and a corresponding one of said pivot connecting portions of said first support rod of the other one of said support assemblies, and two front connecting ends connected pivotally and respectively to one of said pivot connecting portions of said second support rod of said one of said support assemblies and a corresponding one of said pivot connecting portions of said second support rod of said other one of said support assemblies.

10. The safety ladder as claimed in claim 8, further comprising two positioning seats configured to be fixed to the support surface and respectively having an elongated guide hole, and two guide shafts respectively extending through said elongated guide holes in said positioning seats and respectively connected to said upper ends of said first support rods of said support assemblies so as to respectively connect said upper ends of said first support rods of said support assemblies to said positioning seats.

11. The safety ladder as claimed in claim 9, wherein each of said step members includes a step main body, and rear and front pivot shafts extending into said step main body, said rear pivot shaft having said rear connecting ends, said front pivot shaft having said front connecting ends, each of said step members further including a plurality of fastening nuts engaged to said rear connecting ends of said rear pivot shaft and said front connecting ends of said front pivot shaft so as to pivotally connect each of said step members to said first and second support rods of said support assemblies.

12. The safety ladder as claimed in claim 8, further comprising a hook assembly that includes an engaging hook pivotally connected to said second support rod of one of said support assemblies and having an engaging groove, and an engaging pin fixed to said first support rod of said one of said support assemblies for engagement with said engaging groove to place said safety ladder in said storage position.

13. A safety ladder suitable to be mounted between a support surface and a ground surface, comprising:

two support assemblies spaced apart from each other in a left-right direction, each of said support assemblies including a first support rod and a second support rod spaced apart from each other in a front-rear direction transverse to the left-right direction, each of said first and second support rods having an upper end, a lower end opposite to said upper end, and a plurality of spaced-apart pivot connecting portions disposed between said upper end and said lower end; and a plurality of parallel step members pivotally connected between said support assemblies;

wherein said upper ends of said first support rods of said support assemblies are configured to be pivotally connected to the support surface so as to be movable up and down relative to the support surface;

wherein said safety ladder is movable between a use position and a storage position;

wherein, when said safety ladder is moved to said use position, said first and second support rods of said support assemblies stand oblique relative to the support surface and the ground surface, said lower ends of said first and second support rods of said support assemblies are adapted to simultaneously contact the ground surface, and said first and second support rods are parallel to and spaced apart from each other;

wherein, when said safety ladder is moved to said storage position, said first and second support rods of said support assemblies stand substantially perpendicular relative to the ground surface, and are parallel to and spaced apart from each other;

wherein, when said safety ladder is in said use position, said first and second support rods of said support assemblies are configured to form an included angle with the ground surface, and said step members are configured to be disposed substantially parallel to the ground surface even during a change in said included angle;

wherein said safety ladder further comprises a safety and limiting unit which includes a limiting rod fixed to one of said first and second support rods of said one of said support assemblies, and a stop member fixed to the other one of said first and second support rods of said one of said support assemblies, said stop member contacting and stopping said limiting rod when said first support rods of said support assemblies are spaced apart from said second support rods of said support assemblies to maintain a fixed distance between said first and second support rods of said support assemblies, said stop member being distal to said limiting rod when said first and second support rods of said support assemblies are proximate to each other; and wherein said limiting rod is inverted L-shape, and has a fixed section fixed to said first support rod of said one of said support assemblies, and an abutment section extending transversely from one end of said fixed section toward said second support rod of said one of said support assemblies, said limiting rod being proximate to said upper end of said first support rod of said one of said support assemblies, said stop member being proximate to said upper end of said second support rod of said one of said support assemblies.

14. The safety ladder as claimed in claim 13, wherein each of said step members has two rear connecting ends connected pivotally and respectively to one of said pivot connecting portions of said first support rod of one of said support assemblies and a corresponding one of said pivot connecting portions of said first support rod of the other one of said support assemblies, and two front connecting ends connected pivotally and respectively to one of said pivot connecting portions of said second support rod of said one of said support assemblies and a corresponding one of said pivot connecting portions of said second support rod of said other one of said support assemblies.

15. The safety ladder as claimed in claim 13, further comprising two positioning seats configured to be fixed to the support surface and respectively having an elongated guide hole, and two guide shafts respectively extending through said elongated guide holes in said positioning seats and respectively connected to said upper ends of said first support rods of said support assemblies so as to respectively connect said upper ends of said first support rods of said support assemblies to said positioning seats.

16. The safety ladder as claimed in claim 14, wherein each of said step members includes a step main body, and rear and front pivot shafts extending into said step main body, said rear pivot shaft having said rear connecting ends, said front pivot shaft having said front connecting ends, each of said step members further including a plurality of fastening nuts engaged to said rear connecting ends of said rear pivot shaft and said front connecting ends of said front pivot shaft so as to pivotally connect each of said step members to said first and second support rods of said support assemblies.

17. The safety ladder as claimed in claim 13, further comprising a hook assembly that includes an engaging hook pivotally connected to said second support rod of one of said support assemblies and having an engaging groove, and an engaging pin fixed to said first support rod of said one of said support assemblies for engagement with said engaging groove to place said safety ladder in said storage position.

* * * * *